Patented Apr. 25, 1933

1,905,901

UNITED STATES PATENT OFFICE

ARTHUR MAURICE CLARK, OF NORTON-ON-TEES, ENGLAND, ASSIGNOR TO IMPERIAL CHEMICAL INDUSTRIES, LIMITED, OF LONDON, ENGLAND, A BRITISH COMPANY

COLLECTION OF SULPHUR FROM GASES OR VAPORS

No Drawing. Application filed May 14, 1931, Serial No. 537,499, and in Great Britain May 31, 1930.

This invention relates to the separation of elementary sulphur from gases which contain it in gaseous or finely divided liquid or solid state, and is designed in particular to provide an efficient method of collecting sulphur from the hot gaseous products of reactions in which it is formed, as for instance, the reduction of sulphur dioxide by carbon at a high temperature. Such gases usually contain sulphur in relatively low concentration, and in dealing with them much greater difficulty is experienced than in the case of concentrated sulphur vapours. When such dilute sulphur vapours are cooled from the elevated temperature at which they are formed, perhaps of the order of 1000° C., it is found that the sulphur condenses in the form of a mist or fume consisting of liquid or solid sulphur particles in such a fine state of division that it is extremely difficult to separate same from the gas.

I have found by experiments that the temperature at which such condensation occurs, or dew point, varies with the concentration of sulphur vapour in the gas, as is shown by the following table, in which the concentrations are expressed in grams of sulphur per cubic metre of gas:

| Concentration of sulphur | Condensation temperature dew point |
|---|---|
| 50 | 216° C. |
| 100 | 234° C. |
| 150 | 247° C. |
| 200 | 256° C. |
| 250 | 264° C. |
| 300 | 270° C. |

Thus, for instance, if a gas containing 8 per cent of sulphur dioxide is reduced by passage over coke at a temperature of 1100° C. it will afford a gas containing approximately 1 per cent of sulphur vapor, corresponding to a concentration of about 90 grams of sulphur per cubic metre, and this will begin to condense in the form of a mist at about 230° C. This mist or fume can be led through a cold space or made to impinge on a cold surface without any substantial deposition of sulphur.

I have found that if such a fume is maintained at a moderately elevated temperature, ranging from the condensation temperature to 100° C., for a certain period of time, e. g. from 5 seconds upwards according to the state of concentration of the sulphur in the gas, the sulphur particles coagulate and are brought to a much coarser state of division, in which state they are readily separated from the gaseous medium, e. g. by contact on a cold surface, or by filtration. In one case a dilute sulphur vapor on rapid cooling afforded a fume in which the particles had a diameter of approximately 1 micron, whereas a similar vapour on treating by the above method afforded particles having an average diameter of 30 microns.

I have further found that in order to secure uniform results by the above method regard must be paid to the amount of dust particles (foreign matter) present in the initial gas or vapor. Thus if a relatively large number of dust particles are present they apparently act as condensation nuclei and prevent the growth of large sulphur particles. It also appears possible that the production of relatively large sulphur particles is due not so much to the coalescence of smaller particles, or to the growth of initially small particles, as to the formation of a superheated sulphur vapor, which if the cooling conditions are sufficiently carefully controlled as disclosed herein, will condense in the form of relatively large particles. For this to occur it is necessary that there should not be a large number of condensation nuclei present tending to prevent supersaturation, but on the other hand the presence of a certain number of condensation nuclei is advantageous as the said nuclei tend to initiate condensation, which otherwise might be unduly delayed.

The present invention consists, therefore, according to one of its features, in providing an "ageing" period for sulphur fume whereby the initially extremely small particles are caused to coagulate.

According to a further feature of the invention the dust content of this initial gas or vapor is controlled so as to avoid premature condensation of excessive amounts of surphur in the form of relatively small particles, and preferably a certain proportion of dust particles is permitted to be present in order to prevent undue delay in condensation.

According to the present invention in its preferred form hot gases containing free sulphur are subjected to controlled cooling under such conditions that the gases are cooled slowly through the range of temperature immediately succeeding that at which the fume is produced. Thus the rate of cooling may be from 0.1–25° C. per second, and preferably is 5–10° C. per second. Such cooling may be performed in stages, i. e. by passing the gas through a series of vessels each maintained at a uniform temperature within the range in which "ageing" takes place; alternatively, the cooling may be continuous over the said range, e. g. by passing the gas through a chamber or tower the natural rate of cooling of which is modified by lagging or insulating lining in order to maintain the gas within the desired temperature range. The cooling chamber may also take the form of a waste-heat boiler, whereby much of the sensible heat of the gasses is recovered in the form of steam. After the "ageing" treatment the sulphur may be separated from the gas in any suitable manner, e. g. by filtration or by settling in large chambers.

In controlling the dust content of the initial gas or vapor, the gas may be freed from dust particles either partially or wholly, by filtration, e. g. through glass wool or asbestos, or by electrostatic precipitation. As it is diffiuclt, however, to effect precise control of the dust content of the gas or vapor by such means, it is preferred to remove the dust particles as completely as possible by any suitable means and then add to the purified gas or vapor such a quantity of crude gas or vapour as suffices to impart the desired degree of concentration of condensation nuclei.

In illustration of the advantage achieved by controlling the dust content of the initial gas, it may be mentioned that a certain gas containing sulphur vapor, when freed from dust particles by filtration through asbestos and mixed with 5 per cent. of its volume of the crude gas, gave on treatment according to the invention, sulphur particles of average diameter 40 microns. The crude gas, on treatment according to the invention but without removal of any of its dust content, gave sulphur particles of average diameter 30 microns.

The invention also includes the case where a fume of sulphur which has been produced by cooling rapidly to a relatively low temperature, is brought into a more easily separable form by heating it to a temperature below that at which the fume vaporizes and maintaining it at that temperature for the requisite period, or by revaporizing it and then condensing and ageing in the manner described.

I claim:

1. In a process of recovering elemental sulphur from a hot gaseous fluid containing suspended non-gaseous particles and gaseous sulphur at such a low concentration that on rapid cooling of said fluid no substantial deposit of sulphur takes place on impingement on a cold surface, the step of regulating the cooling of said fluid in such a manner that it will take at least 5 seconds to cool said fluid from the dew point of the sulphur in said fluid to about 100° C.

2. In a process of recovering elemental sulphur from a hot gaseous fluid containing suspended non-gaseous particles and gaseous sulphur at such a low concentration that on rapid cooling of said fluid no substantial deposit of sulphur takes place on impingement on a cold surface, the step of regulating the cooling of said fluid in such a manner that the rate of cooling of said fluid is from 0.1–25° C. per second within the temperature range from the dew point of the sulphur in said fluid down to about 100° C.

3. In a process of recovering elemental sulphur from a hot gaseous fluid containing suspended non-gaseous particles and gaseous sulphur at such a low concentration that on rapid cooling of said fluid no substantial deposit of sulphur takes place on impingement on a cold surface, the step of regulating the cooling of said fluid in such a manner that the rate of cooling is from 5–10° C. per second within the temperature range from the dew point of the sulphur in said fluid down to about 100° C.

4. In a process of recovering elemental sulphur from a hot gaseous fluid containing suspended non-gaseous particles and gaseous sulphur at such a low concentration that on rapid cooling of said fluid no substantial deposit of sulphur takes place on impingement on a cold surface, the steps of separating non-gaseous particles from said fluid while the temperature of said fluid is above the dew point of the sulphur contained therein and subsequently regulating the cooling of said fluid in such a manner that it will take at least 5 seconds to cool said fluid from the dew point of the sulphur in said fluid to about 100° C.

5. In a process of recovering elemental sulphur from a hot gaseous fluid containing suspended non-gaseous particles and gaseous sulphur at such a low concentration that on rapid cooling of said fluid no substantial deposit of sulphur takes place on impingement on a cold surface, the steps comprising dividing said fluid into a major and a minor flow, separating non-gaseous particles from said major flow while its temperature is above the dew point of the sulphur contained in said fluid, mixing said minor flow with said filtered major flow, and subsequently regulating the cooling of said recombined fluid in such a manner that it will take at least 5 seconds to cool said fluid from the dew point of the sulphur in said fluid to about 100° C.

In testimony whereof, I affix my signature.

ARTHUR MAURICE CLARK.